(12) United States Patent
Masuda et al.

(10) Patent No.: US 6,626,457 B2
(45) Date of Patent: Sep. 30, 2003

(54) CURTAIN AIRBAG

(75) Inventors: Yasushi Masuda, Echi-gun (JP);
Wataru Nakazawa, Kanzaki-gun (JP);
Ryosuke Nakanishi, Echi-gun (JP)

(73) Assignee: Takata Corporation, Tokyo (JP)

( * ) Notice: Subject to any disclaimer, the term of this patent is extended or adjusted under 35 U.S.C. 154(b) by 47 days.

(21) Appl. No.: 10/005,079

(22) Filed: Dec. 7, 2001

(65) Prior Publication Data

US 2002/0074779 A1 Jun. 20, 2002

(30) Foreign Application Priority Data

Dec. 20, 2000 (JP) .................................... 2000-387498

(51) Int. Cl.⁷ .............................................. B60R 21/16
(52) U.S. Cl. .................. 280/728.2; 280/730.2
(58) Field of Search ....................... 280/728.2, 730.2, 280/743.1, 728.3

(56) References Cited

U.S. PATENT DOCUMENTS

| | | | | |
|---|---|---|---|---|
| 5,791,683 A | * | 8/1998 | Shibata et al. ........... | 280/730.2 |
| 6,149,185 A | * | 11/2000 | White et al. ............. | 280/728.2 |
| 6,234,517 B1 | * | 5/2001 | Miyahara et al. ........ | 280/730.2 |
| 6,296,269 B1 | * | 10/2001 | Nagai et al. ............. | 280/728.2 |
| 6,305,707 B1 | * | 10/2001 | Ishiyama et al. ........ | 280/728.2 |
| 6,439,598 B1 | * | 8/2002 | Braun et al. ............. | 280/728.2 |

FOREIGN PATENT DOCUMENTS

WO         WO01/23183         4/2001

* cited by examiner

Primary Examiner—David R. Dunn
(74) Attorney, Agent, or Firm—Kanesaka & Takeuchi

(57) ABSTRACT

Hangers of the curtain airbag are used to hang a bag body from a structural member of a vehicle. The hangers restrict the deployment direction of the bag body, and receive reaction force produced when the bag body is deployed downwards. The hanger is mounted to an ear of the bag body, and includes a strip-shaped flat plate portion and a sandwiching plate portion formed integrally with the corresponding flat plate portion. The ears of the bag body are sandwiched between inner plates and outer plates of the corresponding sandwiching plate portions. By the flat plate portion of each hanger, the bag body deploys smoothly along an inner surface of the window glass.

10 Claims, 9 Drawing Sheets

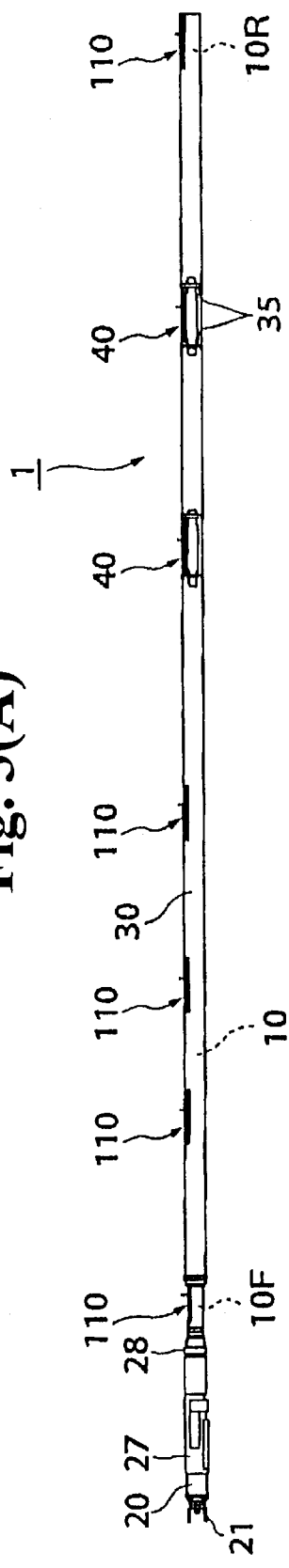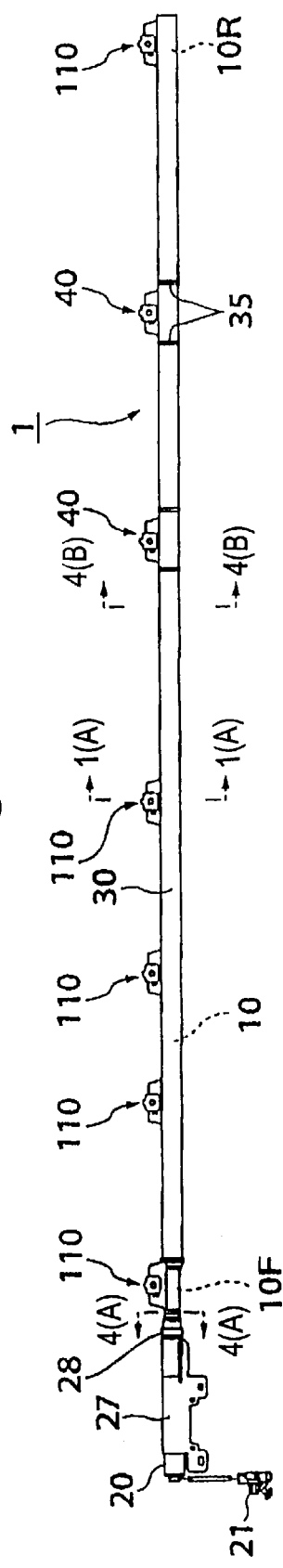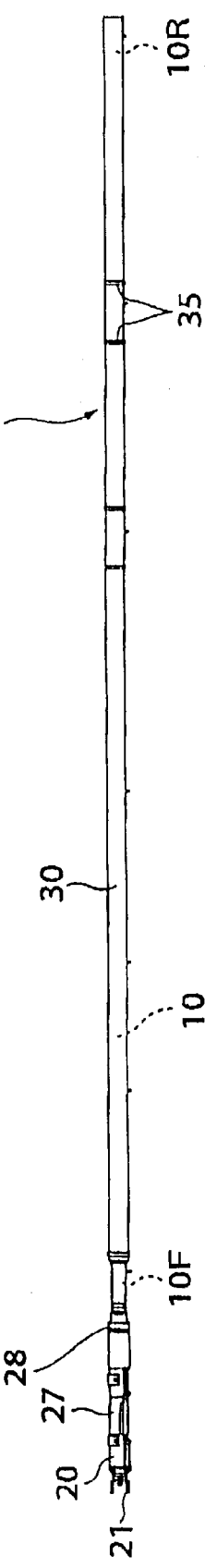

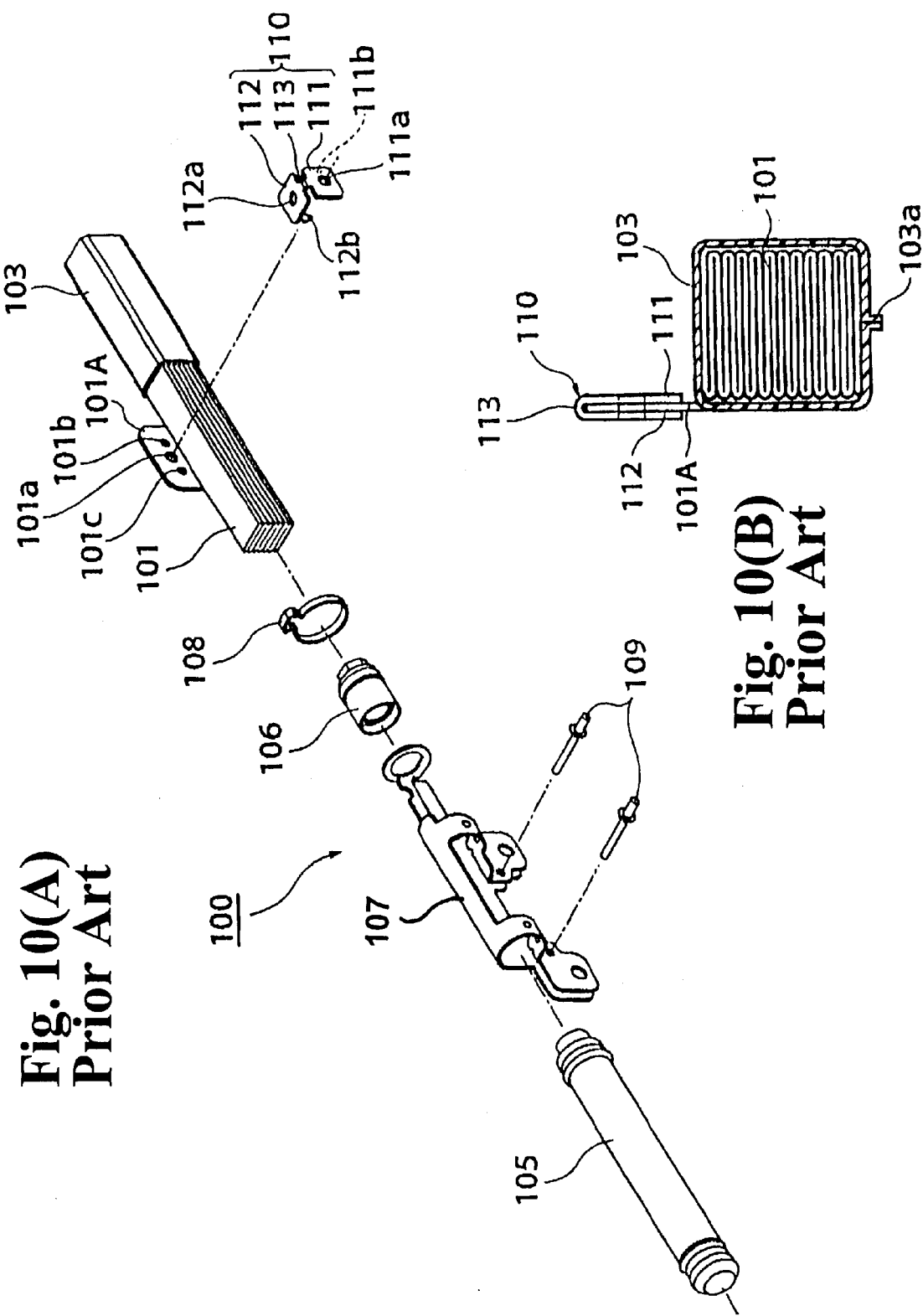

CURTAIN AIRBAG

BACKGROUND OF THE INVENTION AND RELATED ART STATEMENT

The present invention relates to a curtain airbag in which a curtain-shaped airbag portion is deployed at the inner surface side of a side window glass. More particularly, the present invention relates to a curtain airbag which has the advantage of, for example, precisely deploying a bag portion along a side window glass.

In the curtain airbag, a curtain-shaped airbag portion is deployed at the inner surface side of a side window glass beside an occupant at the time of an emergency of a vehicle. By the deployment of the curtain-shaped airbag portion, shock that is exerted on the occupant when the occupant collides with a side surface of the vehicle is absorbed or the occupant is prevented from being thrown out of the vehicle during a roll-over of the vehicle.

FIG. 10(A) is an exploded perspective view of the structure of a conventional curtain airbag, and FIG. 10(B) is a side sectional view of FIG. 10(A).

A curtain airbag 100 shown in FIGS. 10(A) and 10(B) comprises a bag body 101. The bag body 101 is a bag-shaped body that is formed by placing two sheets to be piled each other and joining them together by sewing, bonding, or welding. In a normal condition before deployment, as shown in FIGS. 10(A) and 10(B), the bag body 101 is folded up in bellows. Ears 101A are formed at a top edge of the bag body 101. Although only one ear 101A is shown in FIG. 10(A), a plurality of ears 101A, for example, seven ears 101A, is formed on the bag body 101 at predetermined intervals in a longitudinal direction of the bag body 101. Holes 101a to 101c are formed in each of the ears 101A.

The bag body 101 is accommodated in a sleeve-shaped cover 103, which is rectangular in a cross section. A slit is formed in a top edge, i.e. left top edge in FIG. 10(B), of the cover 103. The ears 101A of the bag body 101 are pulled up outward from the slit. As shown in FIG. 10(B), a tear line 103a is formed in the bottom surface of the cover 103 along a longitudinal direction thereof. When the bag body 101 deploys, the tear line 103a is ruptured, so that the bag body 101 deploys downward from the cover 103. The cover 103 in a condition of receiving the bag body 101 at the inside thereof is disposed along the roof side of the vehicle.

Hangers 110 are mounted to the ears 101A of the bag body 101. The hanger 110 includes a rectangular inner plate 111 and a rectangular outer plate 112. The inner and outer plates 111 and 112 are linked by a corresponding linking portion 113. Each ear 101A of the bag body 101 is sandwiched between the corresponding inner and outer plates 111 and 112 (refer to FIG. 10(B)). Holes 111a and 112a are formed in the center portions of the inner and outer plates 111 and 112, respectively.

A pawl 111b is formed at the right edge of each inner plate 111. A pawl 112b is formed at the left edge of each outer plate 112. In the condition that the hanger 110 is mounted, the pawl 111b of the corresponding inner plate 111 is folded after being inserted into the hole 101b of the corresponding ear 101A, and the pawl 112b of the corresponding outer plate 112 is folded after being inserted into the hole 101c of the corresponding ear 101A. A bolt (not shown) for mounting the curtain air bag 100 to the body of the vehicle is inserted into the holes 111a and 111b of the hanger 110 and the hole 101a of the ear 101A of the bag body 101.

An inflator 105, shown in FIG. 10(A), is connected to an open end of the bag body 101. A cap 106 covers an end, i.e. right end in FIG. 10(A), of the inflator 105. The cap 106 is ruptured by the pressure produced by ignition of the inflator 105. The end of the inflator 105 covered by the cap 106 is secured to the open end of the bag body 101 by a clamp band 108. The inflator 105 is supported at both sides inside a retainer 107. The retainer 107 is secured to, for example, an A pillar of an automobile by screws 109 while supporting the inflator 105.

In the above-described conventional curtain airbag 100, when deployment gas is supplied into the bag body 101 from the inflator 105, the bag body 101 is inflated, so that the tear line 103a of the cover 103 is ruptured, causing the bag body 101 to deploy. At this time, reaction force produced by the deployment of the bag body 101 is received by the ears 101A of the bag body 101 and the hangers 110. However, the deployment direction of the bag body 101 itself is not restricted very much, so that there is a tendency for the bag body 101 to deploy towards the inside of the cabin of an automobile. Therefore, the bag body 101 may not deploy smoothly along the inner surface of a window glass.

The present invention has been made in view of the above-described problems and has as an object the provision of a curtain airbag which has an advantage of being capable of precisely deploying a bag portion along a side window glass.

Further objects and advantages of the invention will be apparent from the following description of the invention.

SUMMARY OF THE INVENTION

To overcome the above-described problems, according to a first aspect of the present invention, there is provided a curtain airbag in which a curtain-shaped airbag portion is deployed along an inner surface side of a window glass, i.e. side window glass, beside an occupant at the time of an emergency of a vehicle. The curtain airbag comprises a bag body; an inflator connected to one end of the bag body for supplying deployment gas; a cover which covers the bag body; a hanger connected to a top end portion of the bag body, which is used to hang the bag body from a structural member of the vehicle; and a restricting member which restricts the deployment direction of the bag body so that the bag body deploys along the inner surface of the window glass.

According to this aspect of the present invention, since the deployment direction of the bag body is restricted by the restricting member, it is possible to smoothly deploy the bag body along the inner surface of the window glass.

According to a second aspect of the present invention, there is provided a curtain airbag in which a curtain-shaped airbag portion is deployed at an inner surface side of a window glass, i.e. side window glass, beside an occupant at the time of an emergency of a vehicle. The curtain airbag comprises a bag body; an inflator connected to one end of the bag body for supplying deployment gas; a cover which covers the bag body; a hanger connected to a top end portion of the bag body, which is used to hang the bag body from a structural member of the vehicle; and a receiving member provided along the top end of the bag body, which receives reaction force produced when the bag body deploys downwards.

According to this aspect of the present invention, the receiving member receives the reaction force produced when the bag body deploys in the downward direction, so that deployment force of the bag body can be concentrated in one, downward direction. Therefore, the bag body smoothly deploys along the inner surface of the window glass. In addition, as a result of the bag body deploying precisely in one downward direction, it is possible to reduce variations in the deployment time of the bag body.

In the curtain airbag of the present invention, the member may be a plate which is provided along the top end of the bag body and which extends substantially perpendicular to the window glass. In this case, by using the plate, reaction force produced when the bag body deploys downward can be precisely received. In addition, when the member is a plate, the structure is simplified, so that it can be easily formed.

The curtain airbag of the present invention may further comprise an inner-surface-side member or skirt that extends down from an occupant-side edge of the plate. In this case, the inner-surface-side member prevents the bag body from protruding towards the inner side, i.e. opposite to the structural member side, when the bag body deploys. Therefore, the bag body deploys more precisely in the downward direction.

In the curtain airbag of the present invention, the restricting member or the receiving member may be provided at the hanger. In this case, the number of component parts used is not increased, thereby making it possible to simplify the structure of the curtain airbag.

BRIEF DESCRIPTION OF THE DRAWINGS

FIG. 3(A) is a top view of the entire structure of the curtain airbag of the invention, FIG. 3(B) is a front view thereof, and FIG. 3(C) is a bottom view thereof;

FIG. 10(A) is an exploded perspective view of the structure of a conventional airbag, and FIG. 10(B) is a side sectional view of FIG. 10(A).

DETAILED DESCRIPTION OF PREFERRED EMBODIMENTS

Figure 1A:
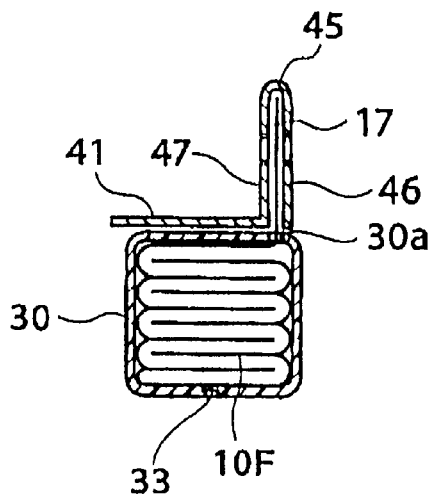
FIG. 1(A) is a sectional view taken along line 1(A)—1(A) of FIG. 3(B)) of an embodiment of a curtain airbag in accordance with the present invention.

Hereunder, a description of the invention will be made with reference to the drawings.

As shown in FIG. 3(A), a curtain airbag 1 broadly comprises the following parts: (1) a bag body 10; (2) a deployment gas supplying inflator 20 connected to a front end 10F of the bag body 10; (3) a cover 30 that accommodates the bag body 10; (4) hangers 40 mounted to corresponding ears 17 of the bag body 10. Each of these parts will be described in detail below.

(1) Bag Body 10

Figure 4A:
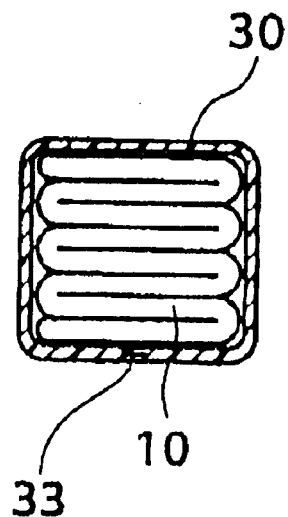
FIG. 4(A) is a sectional view taken along line 4(A)—4(A) of FIG. 3(B)

As shown in FIGS. 1, 4 and the like, the bag body 10 is folded in bellows and accommodated inside the cover 30 in a normal time, i.e. before deployment. As shown in FIG. 5(A), the bag body 10 is formed by piling two sheets upon each other and sewing, bonding, or welding both of these sheets together. A front end (open end) 10F of the bag body 10 is connected to the inflator 20, and a rear end (closed end) 10R and the ears 17 are secured to a structural member of a vehicle. The bag body 10 used in the embodiment is such that the front end 10F is disposed at the side of an A pillar of the vehicle, and the rear end 10R is disposed at the side of a B pillar of the vehicle. The bag body 10 accommodated in the cover 30 is disposed along a roof side rail of the vehicle or automobile.

As shown in FIG. 5(A), an inflatable chamber 15 is formed inside the bag body 10. The inflatable chamber 15 is formed so as to be divided by a seam 11a of the bag body 10. When the bag body 10 deploys, the inflatable chamber 15 is positioned at the inner side of a window glass of the vehicle. A plurality of tether straps 13 (five in FIG. 5) is provided at the inflatable chamber 15 of the bag body 10. Seams 11b are formed between three of the tether straps at the inner side of the inflatable chamber 15.

Inside the bag body 10, a cylindrical portion 16 is formed between the front end 10F and the inflatable chamber 15. The cylindrical portion 16 is a deployment gas path extending from the inflator 20 to the inflatable chamber 15, and is located between two seams 11c formed along the top edge of the bag body 10. The deployment gas entering from the front end 10F of the bag body 10 is supplied into the inflatable chamber 15 while passing through the cylindrical portion 16.

In this embodiment, the number of ears 17 (17A to 17G) formed in the top end of the bag body 10 is seven. As simply shown in FIG. 5(B), a hole 17a is formed in each of the ears 17A to 17G. A corresponding bolt B (see FIGS. 7 to 9), used for mounting the bag body 10 to the structural member of the vehicle, is inserted in each of the holes 17a. The hangers 40 described later are mounted to the ears 17E and 17F. Hangers 110 (see FIG. 10), which are similar to the above-described conventional hanger, are mounted to the other ears 17A to 17D and 17G. The mounted states of the hangers 40 to the ears 17E and 17F of the bag body 10 will be described later.

(2) Inflator 20

Figure 6A:
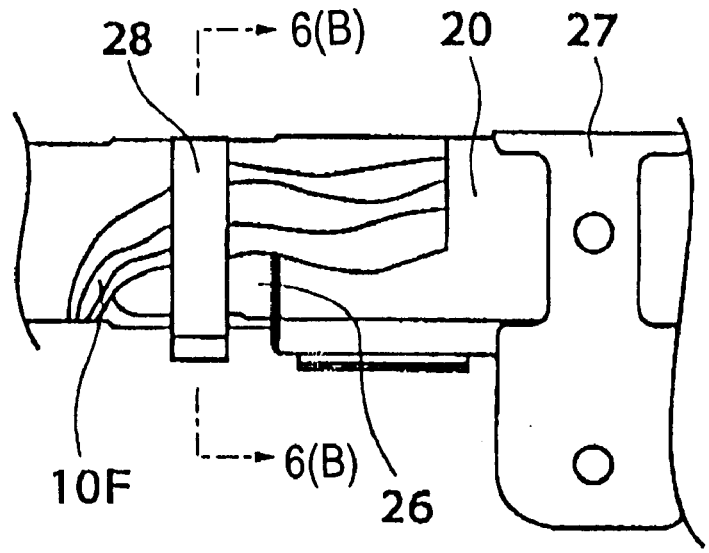
FIG. 6(A) is an enlarged view of the inside of an open end portion, i.e. inflator connecting portion, of the curtain airbag.
Figure 6B:
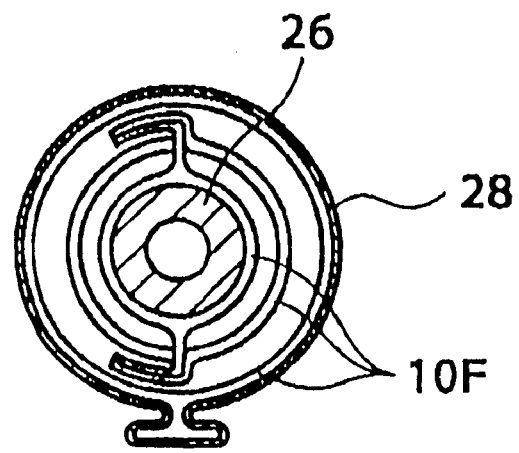
FIG. 6(B) is a sectional view taken along line 6(B)—6(B) of FIG. 6(A)

The inflator 20 is a device that generates gas for inflating and deploying the bag body 10. For the structure of the inflator 20 itself, a conventionally provided structure may be used. The inflator 20 used in the embodiment is rod-shaped, and includes a propellant (not shown) at the inside thereof. As simply shown in FIG. 6(A), a cap 26 covers the front end side (right end side in FIG. 3) of the inflator 20. The cap 26 is ruptured by the pressure upon ignition of the inflator 20. The end of the inflator 20 that is covered by the cap 26 is secured to the front end 10F of the bag body 10 by a clamp band 28. As shown in FIG. 6(B), the front end 10F of the bag body 10 has three layers placed upon each other at a connecting portion thereof.

As shown in FIGS. 3(A)–3(C), a retainer 27 is provided at the outer side of the inflator 20. The inflator 20 is secured to the A pillar of the vehicle and the like through the retainer 27. An initiator 21 is mounted to the rear end side (left end side in FIGS. 3(A)–3(C)) of the inflator 20. The initiator 21 receives an ignition signal from a sensor (not shown) in order to ignite the propellant inside the inflator 20.

(3) Cover 30

Figure 4B:
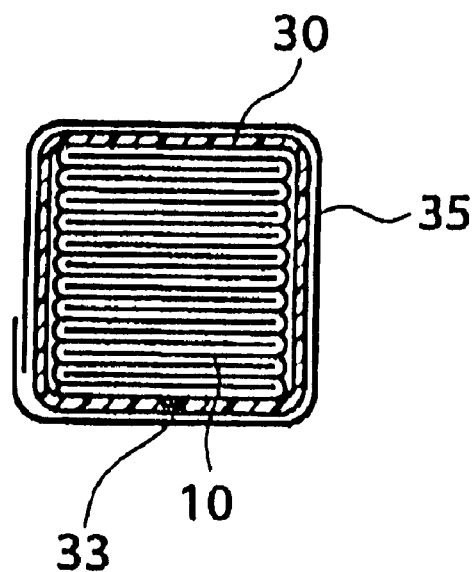
FIG. 4(B) is a sectional view taken along line 4(B)—4(B) of FIG. 3(B)
Figure 5A:
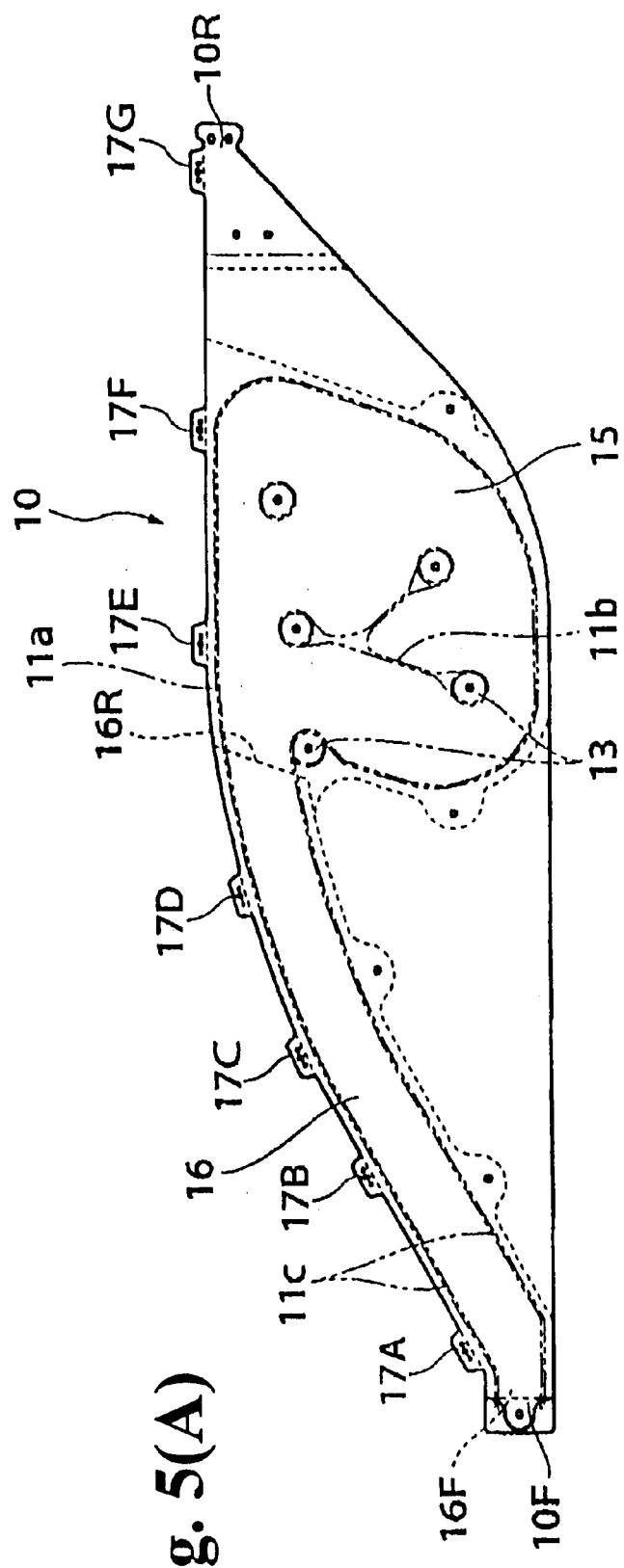
FIG. 5(A) is a plan view showing a state of an airbag body of the curtain airbag after it is deployed.

As simply shown in FIGS. 1(A) and 4(B), the cover 30 is a sleeve-shaped cover, which is rectangular in a cross section. A tear line 33 is formed at the bottom surface of the cover 30 along a longitudinal direction thereof. When the bag body 10 is inflated, the cover 30 is ruptured along the tear line 33, and the bottom side thereof becomes open, as described in detail later. In the condition that the bag body 10 is accommodated inside the cover 30, the cover 30 is disposed along the roof side of the vehicle. As shown in FIG. 1(A), a slit 30a is formed in the upper right edge of the cover 30. The ear 17 of the bag body 10 protrudes outward from the slit 30a.

(4) Hangers 40

The hangers 40, which are characteristic parts of the present invention, are members used to hang the bag body 10 from the structural member of the vehicle, to restrict the deployment direction of the bag body 10, and to receive a reaction force produced when the bag body 10 deploys downward. The hanger 40 is formed, for example, by punching out a stainless steel plate. As mentioned above, the hangers 40 are mounted to the ears 17E and 17F of the bag body 10.

As shown most clearly in FIG. 2, the hanger 40 includes a strip-shaped flat portion 41. The widths of both ends of the flat plate portion 41 of each hanger 40 are smaller than the width of the center portion of the flat plate portion 41 of each hanger 40. Each flat plate portion 41 functions, so called, a restricting member and a receiving member in the present invention. A sandwiching plate portion 43 is integrally formed at the center of one edge (top edge in FIG. 2(A)) of the flat plate portion 41. Each sandwiching plate portion 43 comprises an inner plate 44 connected to its corresponding flat plate portion 41, and an outer plate 46 connected to its corresponding inner plate 44 through a corresponding connecting portion 45. Each sandwiching plate portion 43 is bendable at its corresponding connecting portion 45, and, as simply shown in FIG. 1(A), it sandwiches the corresponding ear 17 of the bag body 10 between the corresponding inner and outer plates 44 and 46. Holes 44a and 46a are formed in the center portions of the inner plates 44 and the outer plates 46, respectively. A pawl 44b is formed at the right edge of each inner plate 44. On the other hand, a pawl 46b is formed at the left edge of each outer plate 46.

Figure 5B:
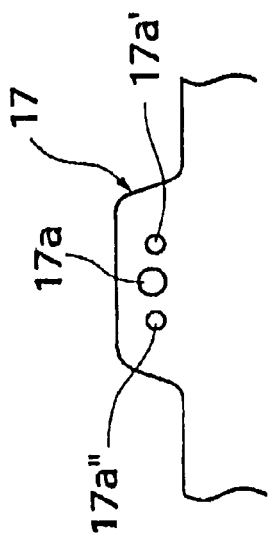
FIG. 5(B) is an enlarged view of an ear.

In the state in which each hanger 40 is mounted, the pawl 44b of each inner plate 44 and the pawl 46b of each outer plate 46 are folded after being inserted into holes 17a' and 17a" (see FIG. 5(B)) of each ear 17 of the bag body 10. This is similar to the conventional way, as in the case shown in FIG. 10(A). As shown in FIGS. 3(A)–3(C), both ends of the flat plate portion 41 of each hanger 40 are secured by corresponding bands 35. As simply shown in FIG. 4(B), each band 35 is placed around the outer periphery of the cover 30. Each band 35 is torn at the same time that the cover 30 is ruptured when the bag body 10 deploys.

The operation of the curtain airbag 1 having the above-described structure will now be explained mainly with reference to FIGS. 7 to 9.

Figure 7:
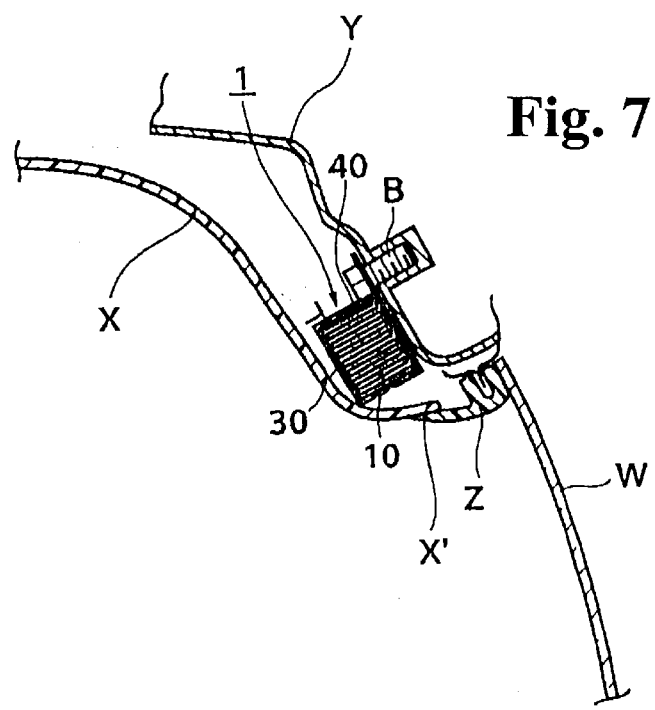
FIG. 7 is a sectional view showing a state of the airbag body of the curtain airbag prior to its deployment.

As shown in FIG. 7, in a normal state, the bag body 10 is folded and accommodated inside the cover 30. The curtain airbag 1 is attached such that each bolt B is inserted into the holes 44a and 46a of the sandwiching plate portion 43 of each hanger 40 and the hole 17a of each ear 17 of the bag body 10, so that, by driving each bolt B into a body Y, i.e. structural member, the curtain airbag 1 is mounted to the body Y. In the mounted state, the curtain airbag 1 is disposed between a roof X and the body Y of the vehicle, so that it is not exposed inside the cabin of the vehicle. Below the curtain airbag 1, a skimmer member Z covers the space between a bottom end X' of the roof X and a window glass W.

When the vehicle collides or turns over and lies on its side, a sensor (not shown) detects this in order to send an ignition signal to the initiator 21 of the inflator 20. The initiator 21 ignites to cause the propellant inside the inflator 20 to ignite, so that deployment gas is generated from the inflator 20. The generated gas tears the cap 26 at the front end of the inflator 20, passes through the cylindrical portion 16 from the front end 10F of the bag body 10, and is supplied to the inflatable chamber 15.

Figure 8:
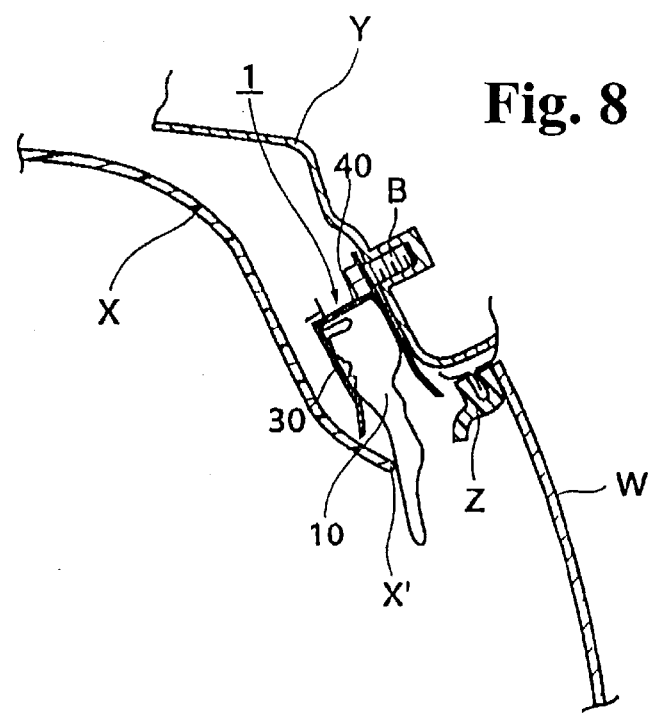
FIG. 8 is a sectional view showing the curtain airbag in an initial state of its deployment.
Figure 9:
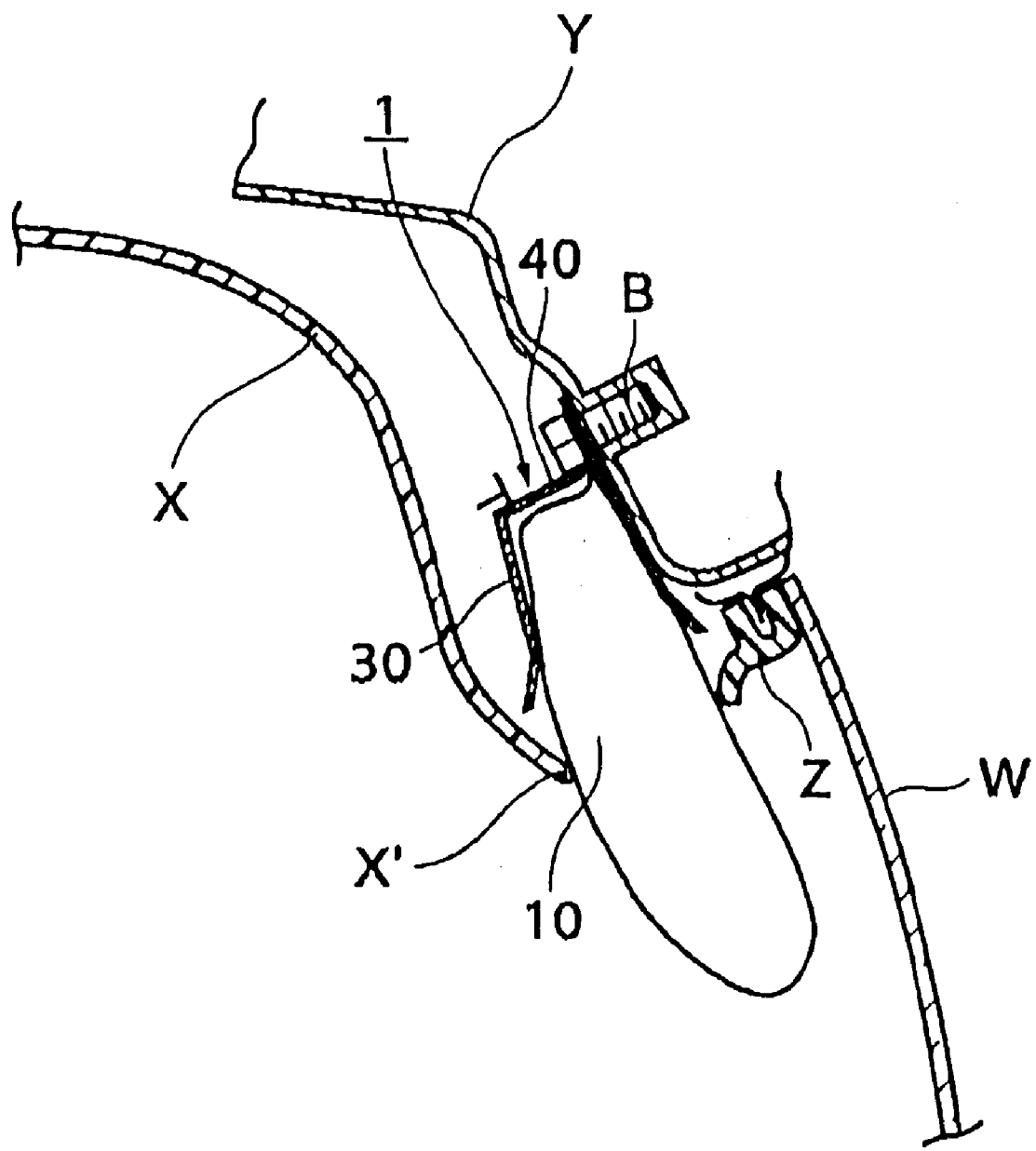
FIG. 9 is a sectional view showing the curtain airbag in an intermediate state of its deployment.

At this time, at the initial stage of the deployment of the bag body 10, as shown in FIG. 8, the tear line 33 at the bottom surface of the cover 30 is torn, so that the bottom surface side of the cover 30 opens. By the shock when the bottom surface of the cover 30 opens as a result of the deployment of the bag body 10, the bottom end X' of the roof X and the skimmer member Z are deformed, so that they are separated from each other. This causes the bag body 10 to extend downward as a result of passing through the bottom surface of the cover 30 and the space between the bottom end X' of the roof X and the skimmer member Z.

On the other hand, at the top surface side of the cover 30, the flat plate portion 41 of each hanger 40 receives a reaction force that is produced when the bag body 10 deploys. This causes the deployment force of the bag body 10 to act in a concentrated manner in one direction (downward). Therefore, after the initial stage of deployment, as shown in FIG. 9, the bag body 10 deploys smoothly along the inner surface of the window glass W. Accordingly, in the curtain airbag 1 of the present invention, by providing the flat plate portions 41 of the corresponding hangers 40, the bag body 10 deploys smoothly along the inner surface of the window glass W. Since the bag body 10 deploys precisely downward in one direction, variations in the deployment of the bag body 10 are reduced.

Figure 1B:
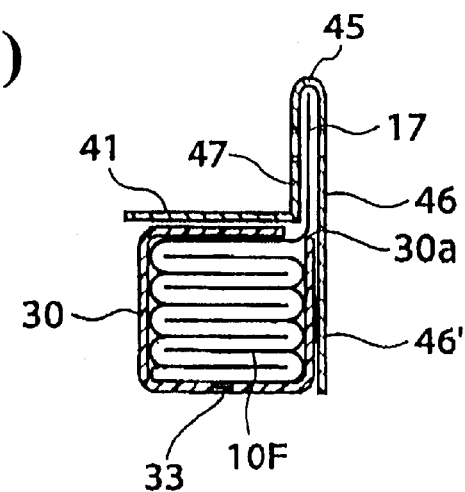
FIGS. 1(B) and 1(C) are sectional views of other examples of a hanger of the curtain airbag.
Figure 1C:
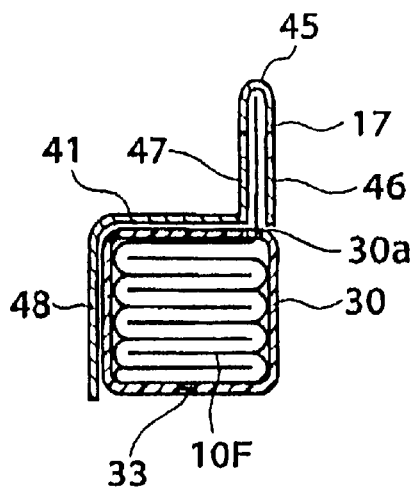

The above-described hangers 40 may be constructed as shown in FIGS. 1(B) and 1(C). The hanger shown in FIG. 1(B) has an outer-surface-side member 46' formed at the lower edge of the outer plate 46 of the sandwiching plate portion 43 of the hanger 40 so as to extend along a side surface of the cover 30. When the extension portion is formed, it becomes difficult for the folded bag to be inflated outward, and the mounting surface of the hanger 40 becomes flat, thereby making it easier to secure the curtain airbag 1 to the body Y.

Figure 2D:
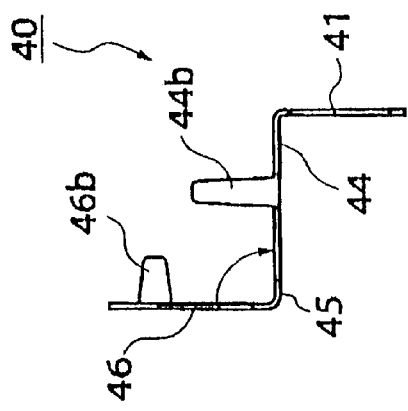
FIG. 2(D) is a right side view thereof.
Figure 2E:
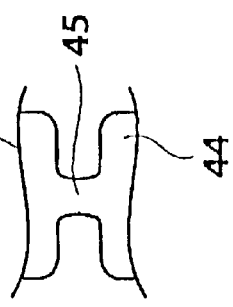
FIG. 2(E) is a partial enlarged view of a connecting portion.
Figure 2A:
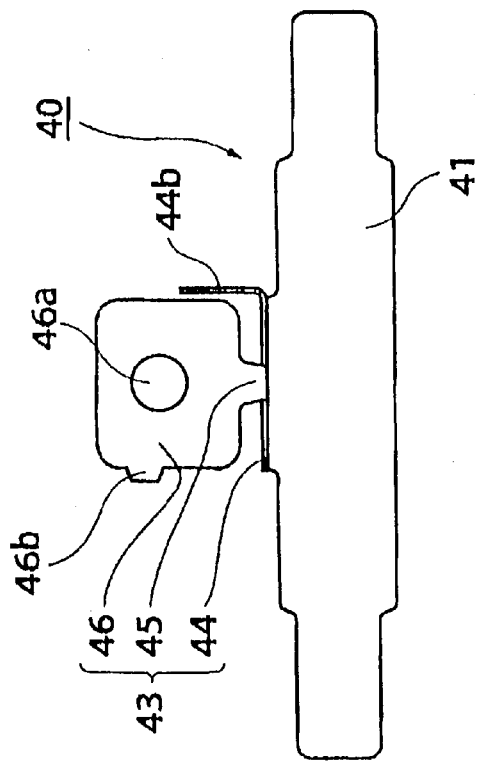
FIG. 2(A) is a plan view of the hanger of the invention.
Figure 2B:
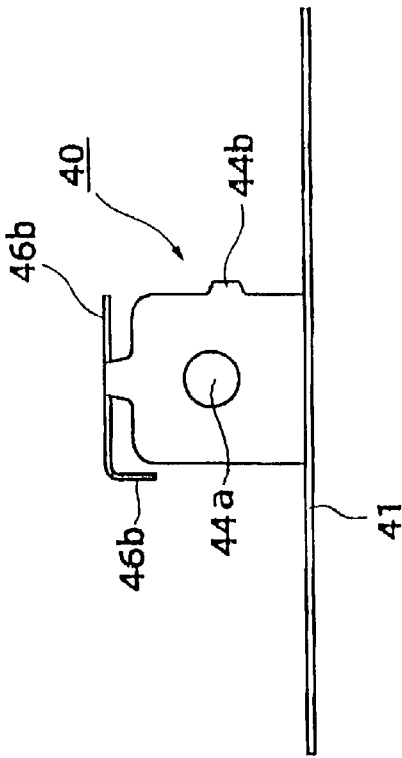
FIG. 2(B) is a front view thereof.
Figure 2C:
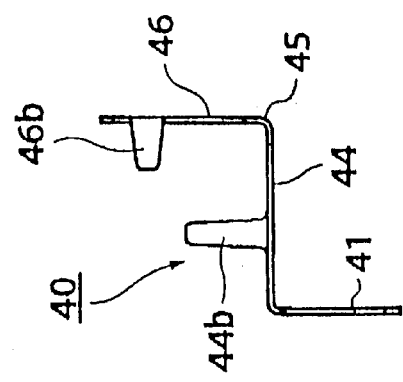
FIG. 2(C) is a left side view thereof.

The hanger shown in FIG. 1(C) has an inner-surface-side member 48 formed at the other side edge, i.e. lower side edge in FIG. 2(A)) of the flat plate portion 41 of the hanger 40 so as to deploy to the bottom end of the cover 30 in a direction perpendicular to the flat plate portion 41. This inner-surface-side member 48 further prevents the deployment of the bag body 10 toward the cabin (roof X) when the bag body 10 deploys. By the inner-surface-side member 48, the bag body 10 is not easily shifted in a side direction when it deploys downward, so that the deployment direction is further restricted.

In the embodiment, the hangers have been described as being previously mounted to the corresponding ears 17 of the bag body 10. However, the hangers may be disposed at the structural member (body Y in FIGS. 7 to 9) of the vehicle, and the ears 17 of the bag body 10 may be mounted to the corresponding hangers when the curtain airbag 1 is to be mounted.

As can be understood from the foregoing description, according to the present invention, it is possible to provide a curtain airbag having the advantage of precisely deploying the bag along a side window glass.

While the invention has been explained with reference to the specific embodiments of the invention, the explanation is illustrative, and the invention is limited only by the appended claims.

What is claimed is:

1. A curtain airbag to be deployed along an inner surface side of a window glass, comprising:

a bag body having an ear projecting upwardly from the bag body;

an inflator connected to one end of the bag body for supplying deployment gas;

a sleeve-shaped cover for covering and encircling an outer periphery of the bag body in a folded state, said cover having a slit at an upper portion thereof through which the ear protrudes outwardly from the cover;

at least one hanger formed of inner and outer plates, said inner and outer plates sandwiching the ear of the bag body therebetween to hold and hang the bag body from a structural member of the vehicle; and a restricting member integrally formed with the at least one hanger and disposed adjacent to the bag body to restrict a deployment direction of the bag body so that the bag body deploys along the inner surface of the window glass when the inflator is actuated.

2. A curtain airbag according to claim 1, wherein the restricting member is a plate provided along a top end of the bag body to extend substantially perpendicular to the window glass.

3. A curtain airbag according to claim 2, further comprising an inner-surface-side member extending from an occupant-side edge of the plate.

4. A curtain airbag according to claim 3, wherein said restricting member has a length extending along a longitudinal direction of the bag body, which is greater than that of the hanger.

5. A curtain airbag according to claim 1, wherein said cover substantially entirely covers the outer periphery of the bag body along a longitudinal direction thereof and has a tear line at a bottom side to allow the bag body to expand therethrough upon inflation of the inflator.

6. A curtain airbag to be deployed along an inner surface side of a window glass, comprising:

a bag body having an ear projecting upwardly from the bag body;

an inflator connected to one end of the bag body for supplying deployment gas;

a sleeve-shaped cover for covering and encircling an outer periphery of the bag body in a folded state, said cover having a slit at an upper portion thereof through which the ear protrudes outwardly from the cover;

at least one hanger formed of inner and outer plates, said inner and outer plates sandwiching the ear of the bag body therebetween to hold and hang the bag body from a structural member of the vehicle; and a receiving member integrally formed with the at least one hanger and provided along a top end of the bag body, said receiving member receiving a reaction force produced when the bag body deploys downwards.

7. A curtain airbag according to claim 6, wherein the receiving member is a plate provided along the top end of the bag body to extend substantially perpendicular to the window glass.

8. A curtain airbag according to claim 7, further comprising an inner-surface-side member extending down from an occupant-side edge of the plate.

9. A curtain airbag according to claim 8, wherein said receiving member has a length extending along a longitudinal direction of the bag body, which is greater than that of the hanger.

10. A curtain airbag according to claim 6, wherein said cover substantially entirely covers the outer periphery of the bag body along a longitudinal direction thereof and has a tear line at a bottom side to allow the bag body to expand therethrough upon inflation of the inflator.

* * * * *